United States Patent [19]

Hayday

[11] Patent Number: 5,565,097
[45] Date of Patent: Oct. 15, 1996

[54] MICRO-SCREEN FILTER DEVICE

[76] Inventor: William A. Hayday, 5 Timber Ridge Dr., Oyster Bay, N.Y. 11771

[21] Appl. No.: 415,606

[22] Filed: Apr. 3, 1995

[51] Int. Cl.$^6$ .................................................. B01D 33/42
[52] U.S. Cl. .......................... 210/167; 210/338; 210/339; 210/380.2; 210/455; 68/12.08; 68/18 F
[58] Field of Search ................................ 68/12.08, 12.13, 68/18 F; 210/167, 323.1, 332, 335, 337, 338, 339, 457, 380.2, 435, 448, 452, 455, 457, 161

[56] References Cited

U.S. PATENT DOCUMENTS

| | | | |
|---|---|---|---|
| 3,189,179 | 6/1965 | McMichael | 68/18 F |
| 3,253,431 | 5/1966 | Minhinnett | 68/12.08 |
| 3,295,689 | 1/1967 | Arvanitakis | 68/18 F |
| 3,401,052 | 9/1968 | Berger et al. | 68/12.08 |
| 4,266,412 | 5/1981 | Merenda | 210/457 |
| 5,139,686 | 8/1992 | Cares | 210/457 |
| 5,242,588 | 9/1993 | Reese | 210/448 |

*Primary Examiner*—W. L. Walker
*Attorney, Agent, or Firm*—Michael I. Kroll

[57] ABSTRACT

A micro-screen filter device for a dry cleaning fluid flow system in a dry cleaning machine, having a cage to receive garments to be cleaned, a main filter with a plurality of filter elements and optional carbon cores, a main filter outlet valve, a main filter bypass valve, a solvent pump, a solvent holding tank, a tank inlet valve, a tank outlet valve, a button trap housing, a button trap inlet pipe, a button trap outlet pipe and a button trap outlet valve. The micro-screen filter device comprises a filter support assembly to be inserted into the button trap housing. A micro-screen filter bag is convoluted over the filter frame body, to remove fine particulates from dry cleaning fluid solvent in the system.

8 Claims, 4 Drawing Sheets

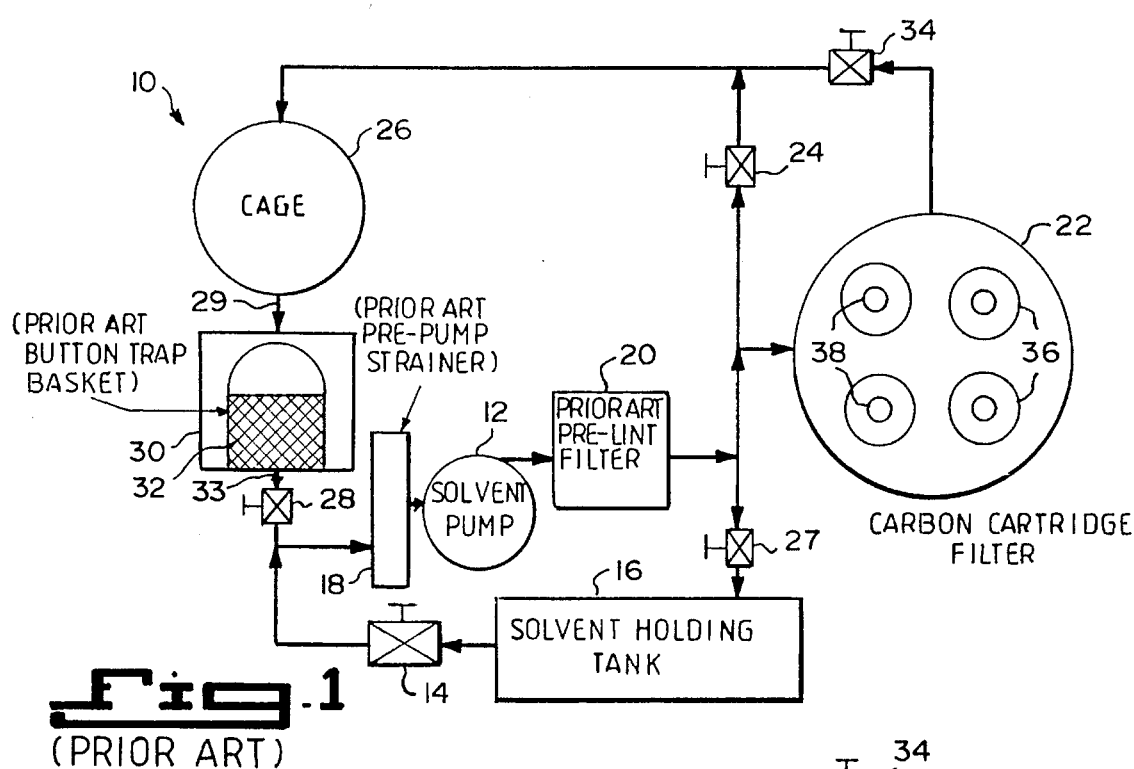
Fig. 1 (PRIOR ART)
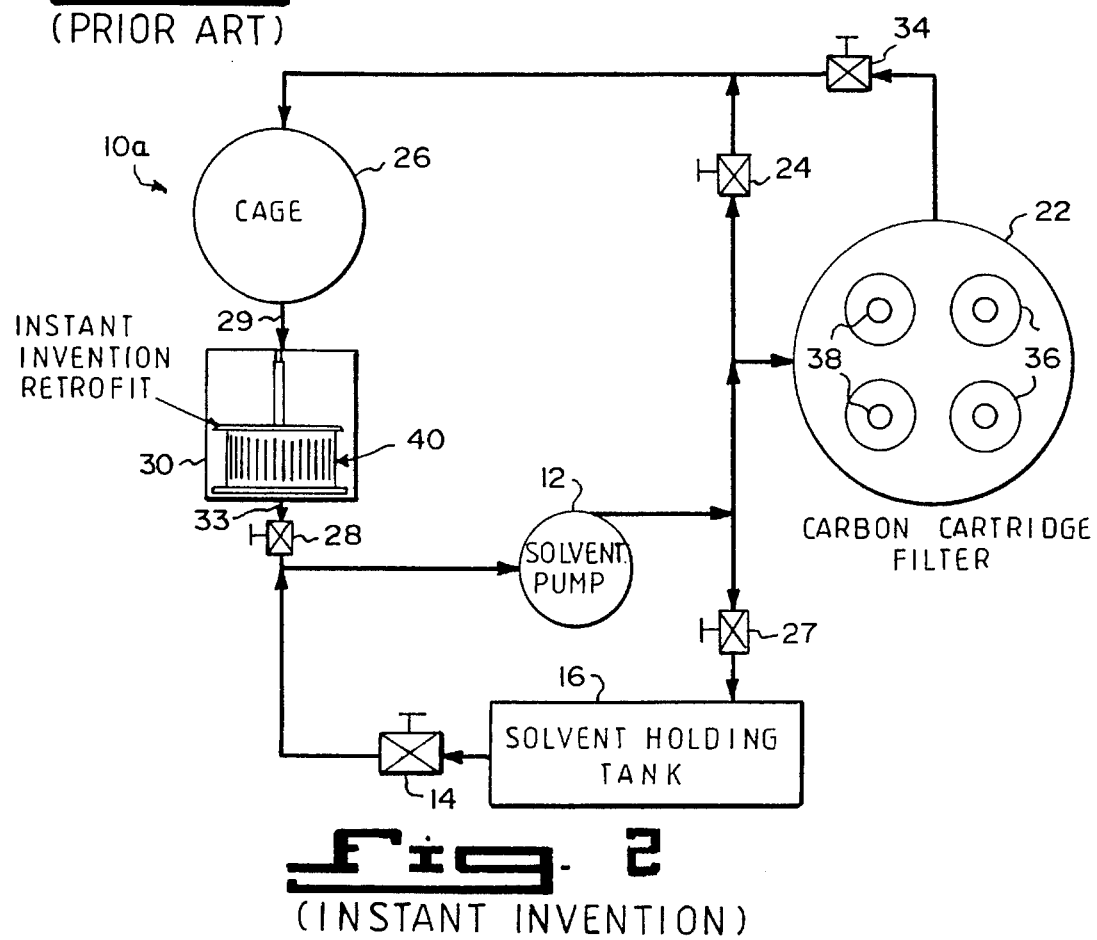
Fig. 2 (INSTANT INVENTION)

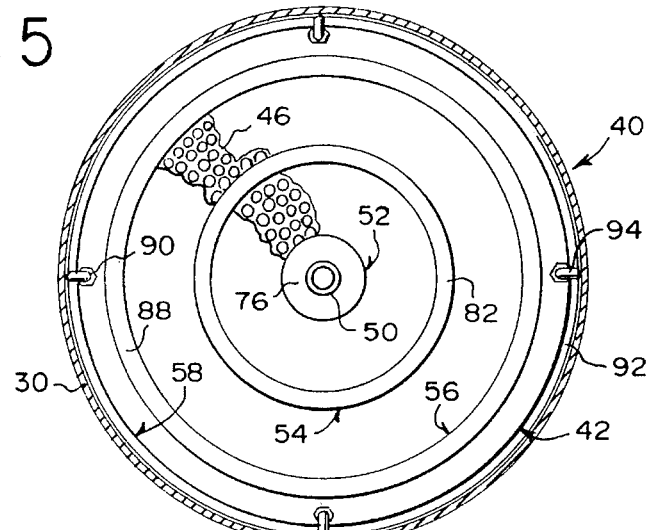
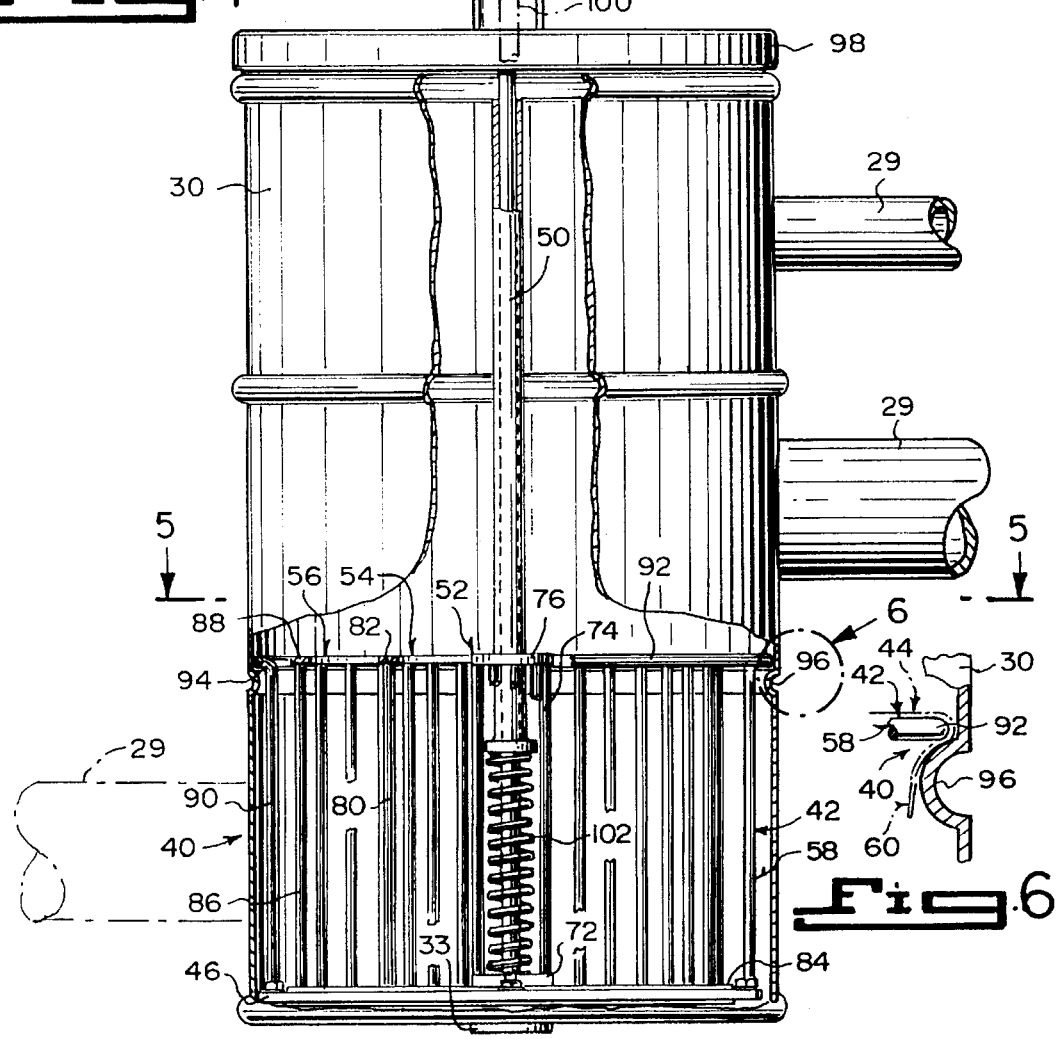

MICRO-SCREEN FILTER DEVICE

BACKGROUND OF THE INVENTION

1. Field of the Invention

The instant invention relates generally to dry cleaning machines and more specifically it relates to a micro-screen filter device for a dry cleaning fluid flow system in a dry cleaning machine.

2. Description of the Prior Art

Numerous dry cleaning machines have been provided in prior art that are adapted to utilize a dry cleaning cycle to clean various garments that are placed into the dry cleaning machines. While these units may be suitable for the particular purpose to which they address, they would not be as suitable for the purposes of the present invention as heretofore described.

SUMMARY OF THE INVENTION

The instant invention is a micro-screen filter device that consists of three basic parts. They are a filter support body, a micro-screen filter bag and a dry bag. The filter support body fits into a button trap housing after the button trap stainer is removed therefrom. The filter support body consists of three cylindrical concentric filter frame units on a disk shaped perforated base plate with a central spring biased pressure rod handle extending upwardly from the base plate. A cylindrical seal ring frame unit is also affixed to the base plate about its circumference.

The micro-screen filter bag is made of micro-mesh material suitable for the liquid being filtered. It is convoluted over the filter support body in such a manner that when it is removed, all of the particulates are contained on the inside of the micro-screen filter bag. A draw string allows the micro-screen filter bag to be sealed to prevent any loss of contents. The dry bag consists of a zippered bag made from micro-mesh material that is much finer than the micro-screen filter bag. The soiled micro-screen filter bag is put into the dry bag and dried. The contents of the micro-screen filter bag can be brushed off once dry and disposed of as an nonhazardous waste.

The bag of the micro-screen filter device is made of synthetic material of sufficient area to ensure adequate solvent flow, while restricting dust and other particles from entering a solvent pump in a dry cleaning machine. The area of the screening medium is sufficient to let liquids pass, while fine particles are caught due to the orifice size. The total area is calculated to allow a full day of cleaning plush a margin of safety before the total screen is clogged.

The solvents passing through the medium to an inlet side of the solvent pump do so at a relatively low pressure. The dust, therefore, is not forced against the micro-screen filter bag as is the case with a pre-lint filter, which is on the pressure side of the solvent pump. This fact plus the extra large area of low micron micro-screening material ensures that very fine dust particles are trapped, but solvent may still flow. It is this fine dust that normally deposits on a main filter and reduces its effective life. The increase in the life of the main filter has a positive impact on environment. Trials show that the main filter life is at a minimum doubled. But if calculated on the basis of pressure rise, tests showed that the life was four times longer than the same unit without the micro-screen filter device. Most main filters are changed when the pressure required to force the solvent through becomes too high, due to the layers of dust in the main filter.

By removing this dust and lint before it impacts the main filter, the main filter life is no longer limited by the pressure build up, it is now limited by the degradation of the carbon cores. Once the carbon cores are saturated by the transient dyes and sub-micro-particles, the main filter must be changed. The micro-screen filter device can be removed at the end of the day and the collected dust removed. If the micro-screen filter bag is a disposable type, it can be disposed of in an appropriate manner.

The bag of the micro-screen filter device is designed to remove fine particulates from the solvent. The micro-screen filter bag is made possible by the use of space age materials that have extremely small and very accurate mesh sizes. The materials can very accurately screen out unwanted particles down to sizes well below one micron. One micron is one thousandth of a millimeter. These materials have other important qualities, the mesh is very clean. Cloth when woven has a very poorly defined orifice area when viewed under the microscope and is usually surrounded by extraneous fibers. The micro-screen filter bag on the other hand has very clean fibers, which do not exhibit any extraneous threads.

The important of this development to the dry cleaner is as follows: If the micro-particles (dust) and not so micro-particles can be prevented from reaching the solvent pump and the main filter, the solvent pump will obviously operate more efficiently but more importantly the main filter will last much longer. The reason for the pressure increase is that micro-dust accumulating on the main filter eventually prevents the passage of solvent through the main filter and the cartridges must be changed. Prevent this dust from reaching the main filter and the main filters useful life will increase dramatically. Some dry cleaners use pre-lint filter for this reason. The only problem with the pre-lint filter is that being on the pressure side of the solvent pump, most of the fine dust shoots straight through and accumulates on the main filter. The main filter obviously lasts longer with a pre-lint filter, however with the micro-screen filter device, they will last much longer.

The micro-screen filter device operates on the lower pressure side of the pump and will remove micro-particulates before they reach the solvent pump or the main filter. This ensures that solvent flow is not compromised and the micro-screen filter device can be easily cleaned at the end of the day. For practical purposes, micron sizes down to 100 microns are used. The limiting factor on the main filter will no longer be one of pressure due to the fine particulates clogging the pores of the main filter, but the saturation of the carbon cores used to entrap dies and other sub-micro-particles.

The choice of which micron size to use is based upon the number of loads and the classification of the cleaning involved and the practical useful life of the carbon cores in the main filter. A larger mesh will let more fine particulate pass and therefore allow more loads to be run before the micro-screen filter bag becomes blocked. A smaller mesh will eliminate more fine particulates and will obviously become blocked earlier. Standard mesh is designed to allow the average dry cleaner to process twelve average loads per day, before cleaning the screen. Some dry cleaners will get 20 loads, some will get only 10, depending on the amount of dust being screened.

If the dry cleaner finds that they need more loads between cleaning, the micro-screen filter bag they select should be at a higher micron size, or use a lower micron size and be prepared to clean the micro-screen filter device more than once per day. Dry cleaners doing less than 12 loads a day of predominantly lighter garments should opt for the lower micron size, in order to screen as much fine dust as possible. Greying will be reduced by removing these dust particles and the useful life of the main filter will be at least double that of any dry cleaning machine using no pre-screening. The savings on filter usage alone will pay for this very fine product many times over. The tanks, air ducts, drying section and drum will accumulate less dust. The garments will have less greying. It will also save perchloroethylene solvent, since a certain amount is wasted at every filter change.

A primary object of the present invention is to provide a micro-screen filter device that will overcome the shortcomings of the prior art devices.

Another object is to provide a micro-screen filter device, that will screen out fine particulates, such as dust and other contaminants in a dry cleaning machine, so as to extend the useful life of a main filter and reduce a greying effect caused by redeposit of dust onto the garments.

An additional object is to provide a micro-screen filter device, that will replace the button trap strainer, eliminate the need for a pre-pump strainer and a pre-lint filter, will improve the quality of the cleaning solvent and will improve the cleanliness of the solvent holding tank.

A further object is to provide a micro-screen filter device that is simple and easy to use.

A still further object is to provide a micro-screen filter device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

The device illustrated is of particular dimension and shape, however, other devices can be any geometric shape. The filter bag shape and loading techniques are, however, the same. The seal ring shown in the drawings is top mounted, however, in some circumstances it may be bottom mounted. The filter bag shape and loading techniques are, however, the same.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 1 is a diagrammatic schematic view of the prior art in a dry cleaning fluid flow system.

FIG. 2 is a diagrammatic schematic view of the instant invention in an improved dry cleaning fluid flow system.

FIG. 4 is a front elevational view taken in the direction of arrow 4 in FIG. 3, with the micro-screen filter bag removed therefrom.

FIG. 5 is a cross sectional view taken along line 5—5 in FIG. 4.

FIG. 6 is an enlarged detail view as indicated by arrow 6 in FIG. 4, showing a portion of the micro-screen filter bag in phantom.

Similar reference characters denote corresponding features consistently throughout the attached drawings.

DETAILED DESCRIPTION OF THE PREFERRED EMBODIMENTS

Figure 3:
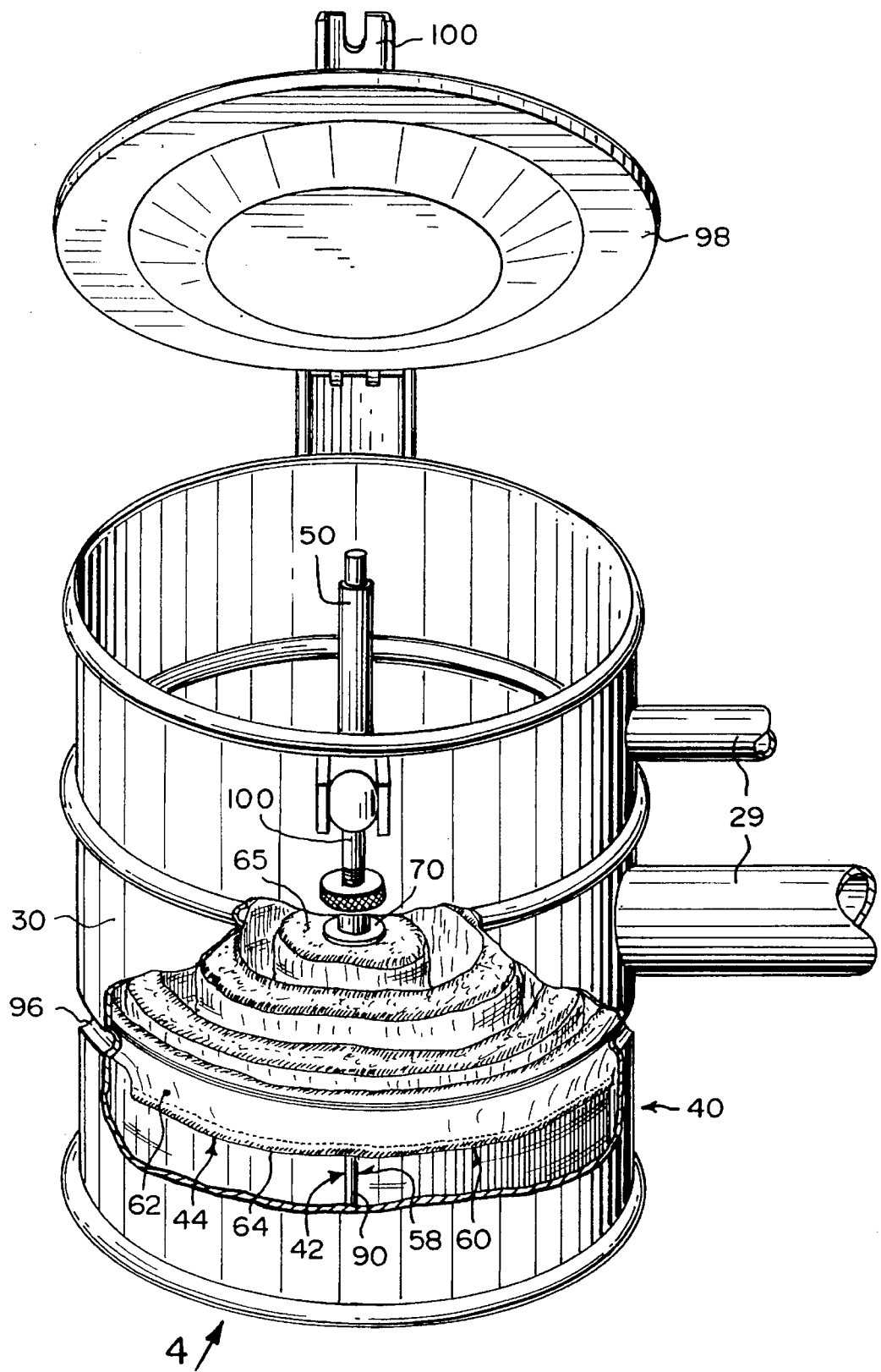
FIG. 3 is a perspective view with parts broken away and in section of the instant invention placed within the button trap housing.
Figure 7:
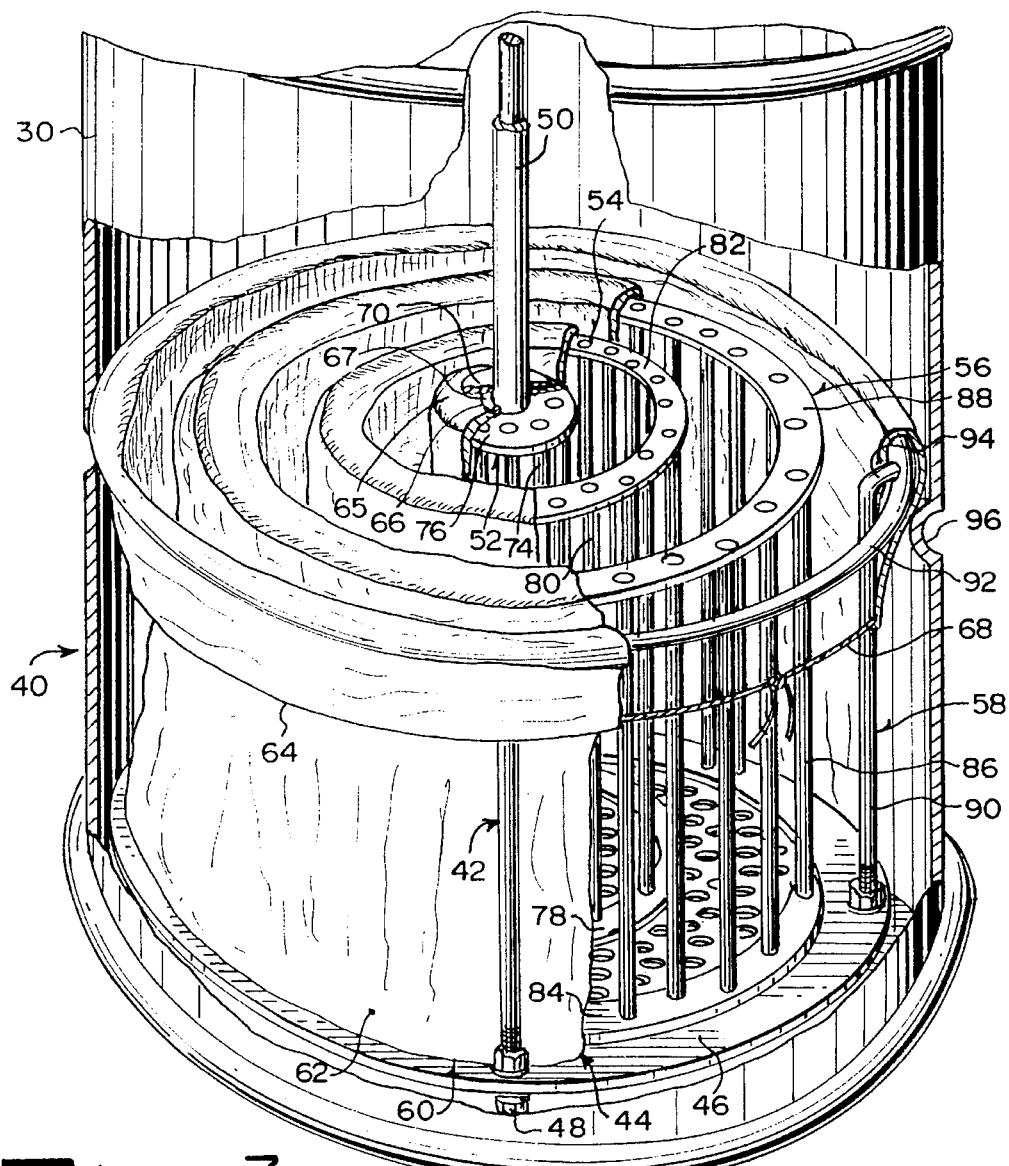
FIG. 7 is an enlarged perspective view of the lower portion of the button trap housing, showing the instant invention therein with part of the micro-screen filter bag broken away.

Turning now descriptively to the drawings, in which similar reference characters denote similar elements throughout the several views, FIG. 1 illustrates the prior art being typically a dry cleaning fluid flow system 10 in a dry cleaning machine and operates as follows: Dry cleaning fluid is pumped by a solvent pump 12, through a tank outlet valve 14 from a solvent holding tank 16. Solvent passes through a pre-pump strainer 18, through the solvent pump 12, through a pre-lint filter 20 and either through a main filter 22 or through a main filter bypass valve 24 to a cage 26. When sufficient level is reached in the cage 26, the tank outlet valve 14 closes. Circulation is now from the cage 26 into a button trap inlet pipe 29, through a button trap housing 30 with a button trap strainer 32, out of a button trap outlet pipe 33, through the button trap outlet valve 28, through the pre-pump strainer 18 and the solvent pump 12, through the pre-lint filter 20 through either the main filter 22 and a main filter outlet valve 34, or through the main filter bypass valve 24 back to the cage 26.

During this process the cage 26 is rotated back and forth to provide mechanical action to the solvent washing process. As the result of solvent contacting the garments and the mechanical action, the garments release both fibers/lints and fatty acids which have bound dust particles to the garments. They also release transient dyes. These flow through the button trap strainer 32, where large particles are trapped. It then passes the pre-pump strainer 18, which takes out smaller particles to prevent the solvent pump 12 from clogging. The pre-lint filter 20 further reduces the levels of lint to protect the main filter 22. The pre-lint filter 20 should be cleaned daily as should the button trap strainer 32 and pre-pump strainer 18. The main filter 22 strains the remainder of the lint and the micro-particles of dust. As the main filter 22 is filtering all of the dust, it eventually becomes clogged and the solvent pressure is so high that filter elements 36 must be changed. When a carbon core filter is used, this will be long before the useful life of carbon cores 38 have expired. At this point, the build up on the main filter 22 is considered hazardous waste and must be dealt with accordingly.

FIG. 2 shows the instant invention being a micro-screen filter device 40 utilized within an improved dry cleaning fluid flow system 10a. The solvent circulation path is the same as previously described above, however, in FIG. 2, the button trap strainer 32 has been replaced in the button trap housing 30 by the micro-screen filter device 40. The pre-pump strainer 18 has been eliminated as has the pre-lint filter 20.

The micro-screen filter device 40, as best seen in FIGS. 3 through 7, consists of a filter support body 42, to be inserted into the button trap housing 30. A micro-screen filter bag 44 is convoluted over the filter support body 42, to remove fine particulates from dry cleaning fluid solvent in the system 10a.

The filter support body 42 includes a disk shaped perforated base plate 46. A plurality of bottom stand off members 48 are about the base plate 46, so as to elevate the base plate 46 off of the bottom of the button trap housing 30, which is cylindrical shaped, but could be any geometry. A rod handle 50 extends upwardly from the center of the base plate 46. An inner cylindrical filter frame unit 52 is affixed to the base plate 46 and extends concentrically about the rod handle 50. A middle cylindrical filter frame unit 54 is affixed to the base plate 46 and extends concentrically about the inner cylindrical filter frame unit 52. An outer cylindrical filter frame unit 56 is affixed to the base plate 46 and extends concentrically about the inner and middle cylindrical filter frame units 52 and 54. A cylindrical seal frame unit 58 is affixed to the base plate 46 and extends concentrically about the outer cylindrical filter frame unit 56.

The micro-screen filter bag 44 consists of a flexible container 60 fabricated out of a micro-mesh material 62, suitable to filter the liquid solvent. The flexible container 60 has a large open mouth 64 and a narrow bottom end 65, with a small aperture 66 therethrough. A reinforced guide ring 67 on the small aperture 66 fits over the rod handle 50. A draw string 68 is sewn into the flexible container 60 about the mouth 64. When the flexible container 60 is removed, the draw string 68 can close the mouth 64 and be tied for proper disposal. A bag retainer washer 70 fits over the rod handle 50 and covers the reinforced guide ring 67 at the narrow bottom end 66 of the flexible container 60.

The inner cylindrical filter frame unit 52 contains a small bottom ring member 72 affixed to the base plate 46. A first set of spaced apart upright posts 74 are affixed to the small bottom ring member 72. A small top ring member 76 is affixed to the first set of spaced apart upright posts 74.

The middle cylindrical filter frame unit 54 includes a medium bottom ring member 78, affixed to the base plate 46. A second set of spaced apart upright posts 80 are affixed to the medium bottom ring member 78. A medium top ring member 82 is affixed to the second set of spaced apart upright posts 80.

The outer cylindrical filter frame unit 56 consists of a large bottom ring member 84, is affixed to the base plate 46. A third set of spaced apart upright posts 86 are affixed to the large bottom ring member 84. A large top ring member 88, is affixed to the third set of spaced apart posts 86.

The cylindrical seal frame unit 58 comprises a plurality of spaced apart upright hook bolts 90, affixed to the base plate 46. A seal ring 92 is affixed to hook ends 94 of the hook bolts 90. When the filter support body 42 is inserted into the button trap housing 30, the seal ring 92 will seal an overlapped upper end of the flexible container 60 adjacent the open mouth 64 of the micro-screen filter bag 44 against an annular inner facing seal ridge 96 in the button trap housing 30, by a lid 98 on the button trap housing 30 being closed and pressing upon the rod handle 50 and locked by a lid lock latch 100. The rod handle 50 includes a spring 102 thereon, to spring bias pressure the rod handle 50 against the closed lid 98 of the button trap housing 30, to force the seal ring 92 down on the overlapped upper end of the flexible container 60 against the annular inner facing seal ridge 96.

The seal ring 92, as shown in FIGS. 1 through 7, is top mounted. In some circumstances, the button trap inlet pipe 29 may be lower down on the button trap housing 30. As shown in phantom lines in FIG. 4, the seal ring 92 will then be bottom mounted to contact the annular inner facing seal ridge 26, which will be near the bottom of the button trap housing 30.

Figure 8:
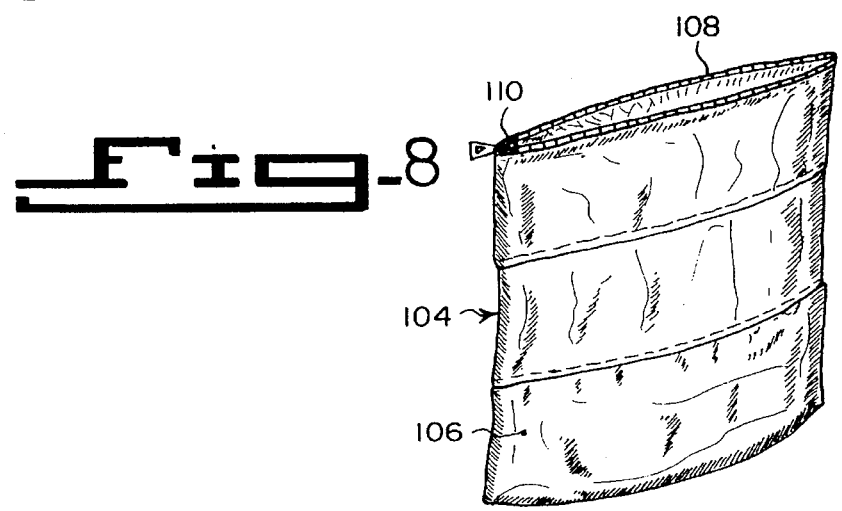
FIG. 8 is a perspective view of the dry bag.

FIG. 8 shows a dry bag 104, fabricated out of a micro-mesh and other materials 106 finer than the micro-screen filter bag 44. The dry bag 104 has an open end 108, with a slide fastener 110 along the open end 108. The micro-screen filter bag 44 when soiled can be placed into the dry bag 104 and the slide fastener 110 closed. This allows the micro-screen filter bag 44 to be dried. The micro-screen filter bag 44 can be turned inside out and it's contents be brushed off and disposed of.

OPERATION OF THE INVENTION

Directions

Bag Loading: When loading the micro-screen filter bag 44 it is important to load with the seams outward. This will ensure easy cleaning at the end of the day.

Step 1: Insert the micro-screen filter bag 44 over the handle 50, with the seams facing outward. The reinforced guide ring 67 in the narrow bottom end 66 of the micro-screen filter bag 44 will allow the micro-screen filter bag 44 to slide over the handle 50 to the small top ring member 76 of the inner cylindrical filter frame unit 52.

Step 2: Starting from the center, push the micro-screen filter bag 44 over the concentric units, starting with the inner cylindrical filter frame unit 52 and working outwards to the outer cylindrical filter frame unit 56. The micro-screen filter bag 44 should fit loosely between the frame units 52, 54 and 56.

Step 3: Continue pushing the micro-screen filter bag 44 over the last frame unit 56 and down between the seal ring 92 and the outside of the outer frame unit 56.

Step 4: Overlap the seal ring 92 half way with the soft material on the micro-screen filter bag 44. Make sure that only the soft material overlaps the seal ring 92.

Step 5: Tighten and tie off the draw string 68, to ensure that the soft material is held securely over the seal ring 92. This should be only tightened enough to prevent the seal cloth from slipping back over the seal ring 92. Over tightening will choke off the filter area.

Step 6: Remove the existing (prior art) button trap strainer 32 and insert the micro-screen filter device 40. The length of the rod handle 50 ensures that when the button trap lid 98 is closed, a very light pressure will be applied through this rod handle 50 to the seal ring 92, to ensure that the particulates do not pass between the seal ring 92 and the button trap housing 30. The seal ring 92 can also be adjusted in circumference, to ensure a good seal contact with the walls of the button trap housing 30.

Cleaning the Micro-Screen Filter Bag 44 After 12 Loads:

1. Remove the micro-screen filter device 40 from the button trap housing 30.
2. Lift the micro-screen filter bag 44 off of the seal ring 92 and frame units 52, 54 and 56.
3. Place the micro-screen filter bag 44 in wet storage, or place immediately in the dry bag 104 and dry the contents for a few minutes in the dry cleaning machine.
4. Once dry, the micro-screen filter bag 44 can be pulled inside out and brushed off into a suitable container. CAUTION. Use only a nylon or natural bristle brush. Do not use a metal brush, since this will damage the micro-screen filter bag 44.

After 50 Loads:
1. Dry the micro-screen filter bag 44 in the dry cleaning machine, using the dry bag 104.
2. Wash the micro-screen filter bag 44 in warm soapy water, to remove accumulated soap and sizing. Dry at a medium setting.

LIST OF REFERENCE NUMBERS

10 dry cleaning fluid flow system
10*a* improved dry cleaning fluid flow system
12 solvent pump
14 tank outlet valve
16 solvent holding tank
18 pre-pump strainer (prior art)
20 pre-lint filter (prior art)
22 main filter
24 main filter bypass valve
26 cage
27 tank inlet valve
28 button trap outlet valve
29 button trap inlet pipe
30 button trap housing
32 button trap strainer (prior art)
33 button trap outlet pipe
34 main filter outlet valve
36 filter element in 22
38 optional carbon core in 36
40 micro-screen filter device
42 filter support body in 30
44 micro-screen filter bag on 42
46 disk shaped perforated base plate of 42
48 bottom stand off member on 46
50 rod handle of 42
52 inner cylindrical filter frame unit of 42
54 middle cylindrical filter frame unit of 42
56 outer cylindrical filter frame unit of 42
58 cylindrical seal frame unit of 42
60 flexible container for 44
62 micro-mesh material of 60
64 large open mouth in 60
65 narrow bottom end inner seal in 60
66 small aperture in 65
67 reinforced guide ring on 66
68 draw string in 60 at 64
70 bag retainer washer
72 small bottom ring member of 52
74 upright post of 52
76 small top ring member of 52
78 medium bottom ring member of 54
80 upright post of 54
82 medium top ring member of 54
84 large bottom ring member of 56
86 upright post of 56
88 large top ring member of 56
90 upright hook bolt of 58
92 seal ring of 58
94 hook end of 90
96 annular inner facing seal ridge in 30
98 lid on 30
100 lid lock latch between 30 and 98
102 spring on 50
104 dry bag
106 micro-mesh material of 104
108 open end in 104
110 slide fastener on 108

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A micro-screen filter device for a dry cleaning fluid flow system in a dry cleaning machine, having a cage to receive garments to be cleaned, a main filter with a plurality of filter elements and optional carbon cores, a main filter outlet valve, a main filter bypass valve, a solvent pump, a solvent holding tank, a tank inlet valve, a tank outlet valve, a button trap housing, a button trap inlet pipe, a button trap outlet pipe and a button trap outlet valve, said micro-screen filter device comprising:

a. a filter support body to be inserted into the button trap housing, said filter support body including a disk shaped perforated base plate, a plurality of bottom stand off members about said base plate, so as to elevate said base plate off of the bottom of the button trap housing which is cylindrical shaped, a rod handle extending upwardly from the center of said base plate, an inner cylindrical filter frame unit affixed to said base plate and extending concentrically about said rod handle, a middle cylindrical filter frame unit affixed to said base plate and extending concentrically about said inner cylindrical filter frame unit, an outer cylindrical filter frame unit affixed to said base plate and extending concentrically about said inner and middle cylindrical filter frame units, and a cylindrical seal frame unit affixed to said base plate and extending concentrically about said outer cylindrical filter frame unit; and b. a micro-screen filter bag that is convoluted over said filter support body, to remove fine particulates from dry cleaning fluid solvent in the system, said micro-screen filter bag including a flexible container fabricated out of a micro-mesh material suitable to filter the liquid solvent, said flexible container having a large open mouth and a narrow bottom end with a small aperture therethrough, a reinforced guide ring on said small aperture to fit over said rod handle, and a draw string sewn into said flexible container about said mouth, so that when said flexible container is removed said draw string can close said mouth and be tied for proper disposal.

2. A micro-screen filter device as recited in claim 1, further including bag retainer washer to fit over said rod handle and cover said reinforced guide ring at said narrow bottom end of said flexible container.

3. A micro-screen filter device as recited in claim 1, wherein said inner cylindrical filter frame unit includes:

a) a small bottom ring member affixed to said base plate;
   b) a first set of spaced apart upright posts affixed to said small bottom ring member; and
   c) a small top ring member affixed to said first set of spaced apart upright posts.

4. A micro-screen filter device as recited in claim 1, wherein said middle cylindrical filter frame unit includes:

a) a medium bottom ring member affixed to said base plate;

b) a second set of spaced apart upright posts affixed to said medium bottom ring member; and c) a medium top ring member affixed to said second set of spaced apart upright posts.

5. A micro-screen filter device as recited in claim 1, wherein said outer cylindrical filter frame unit includes:

a) a large bottom ring member affixed to said base plate;

b) a third set of spaced apart upright posts affixed to said large bottom ring member; and c) a large top ring member affixed to said third set of spaced apart posts.

6. A micro-screen filter device as recited in claim 1, wherein said cylindrical seal frame unit includes:

a) a plurality of spaced apart upright hook bolts affixed to said base plate; and b) a seal ring affixed to hook ends of said hook bolts, so that when said filter support body is inserted into the button trap housing, said seal ring will seal an overlapped upper end of said flexible container adjacent said open mouth of said micro-screen filter bag against an annular inner facing seal ridge in the button trap housing by a lid on the button trap housing being closed and pressing upon said rod handle and locked by a lid lock latch.

7. A micro-screen filter device as recited in claim 6, wherein said rod handle includes a spring thereon to spring bias pressure said rod handle against the closed lid of the button trap housing, to force said seal ring down on the overlapped upper end of said flexible container against the annular inner facing seal ridge.

8. A micro-screen filter device as recited in claim 1, further including:

a) a dry bag fabricated out of a micro-mesh and other materials finer than said micro-screen filter bag, said dry bag having an open end; and b) a slide fastener along said open end, so that said micro-screen filter bag when soiled can be placed into said dry bag and said slide fastener closed, allowing said micro-screen filter bag to be dried, said micro-screen filter bag can be turned inside out and contents be brushed off and disposed of.

\* \* \* \* \*